United States Patent Office 3,274,241
Patented Sept. 20, 1966

3,274,241
PREPARATION OF NAPHTHALENE-2,6-
DICARBOXYLIC ACID
Raymond Wynkoop, Gladwyne, Pa., assignor to Sun Oil Company, Philadelphia, Pa., a corporation of New Jersey
No Drawing. Filed Oct. 15, 1962, Ser. No. 230,716
7 Claims. (Cl. 260—515)

This invention relates to the preparation of naphthalene-2,6-dicarboxylic acid. More specifically it relates to a process in which naphthalene is converted to alkali metal salts of dihydronaphthalene dicarboxylic acid in which the carboxylate groups are positioned other than in the 2,6-arrangement and in which such salts are simultaneously dehydrogenated and isomerized to yield alkali metal naphthalene-2,6-dicarboxylate which can be converted to the corresponding diacid by acidification with a mineral acid.

Naphthalene dicarboxylic acid in which the carboxyl groups are located at the 2,6-positions is a highly desired compound since it can be used for making polyester type polymers which have exceptionally good properties for making fibers and related materials. Naphthalene-2,6-dicarboxylic acid can be prepared by the liquid phase oxidation of 2,6-dimethylnaphthalene by means of molecular oxygen at temperatures in the range of 100–250° C. and in the presence of cobalt or other metal oxidation catalysts and a bromine compound as described in Saffer et al., United States Patent No. 2,833,816. Oxidizing agents such as alkali dichromates also can be used for the oxidation of 2,6-dimethylnaphthalene to 2,6-naphthalene dicarboxylic acid.

A difficulty in producing 2,6-naphthalene dicarboxylic acid by the oxidation of 2,6-dimethylnaphthalene lies in finding a suitable source of 2,6-dimethylnaphthalene. This compound occurs in coal tar and in cracked petroleum distillates of the appropriate boiling range but only in low proportions and associated with it are other dimethylnaphthalene isomers and other hydrocarbons. The separation of 2,6-dimethylnaphthalene in high purity by extraction and fractional crystallization adds greatly to the cost of producing the 2,6-diacid in this manner.

The present invention provides a process for preparing naphthalene-2,6-dicarboxylic acid from a more readily available and less expensive starting material, namely, naphthalene. In the process the following transformations are effected:

(1) Naphthalene is reacted with potassium, rubidium or cesium in the presence of an ether solvent to form an alkali metal naphthalene complex.

(2) This complex is reacted with carbon dioxide in the presence of the solvent to form alkali metal dihydronaphthalene dicarboxylates in which the carboxyl groups are located at positions other than the 2,6-positions.

(3) After separation from the solvent the dihydronaphthalene dicarboxylates of potassium, rubidium or cesium as the case may be are heated to a temperature in the range of 350–530° C. in the presence of two different types of catalysts, and in the presence of a hydrogen acceptor as hereinafter described. This effects simultaneous dehydrogenation of the dihydronaphthalene nucleus and rearrangement of the carboxylate groups and produces the alkali metal naphthalene-2,6-dicarboxylate.

(4) The dicarboxylate salt is acidified with a mineral acid such as hydrochloric acid to yield naphthalene-2,6-dicarboxylic acid.

(5) The alkali metal chloride resulting from the preceding step is heated with metallic sodium to form sodium chloride and yield free alkali metal which can be recycled to the first step of the process.

In another aspect of the invention dihydronaphthalene dicarboxylates of potassium, rubidium or cesium which have been prepared in any manner and in which the carboxylate groups are positioned other than in the 2,6-arrangement on the dihydronaphthalene nucleus are reacted under the conditions of Step (3) supra to produce the alkali metal naphthalene-2,6-dicarboxylate which can then be acidified to obtain the 2,6-diacid.

In converting naphthalene to the 2,6-diacid derivative, the first step in the process comprises reacting the naphthalene in an ether solvent, such as methyl ethyl ether, with potassium, rubidium or cesium. This reaction can be carried out merely by contacting the naphthalene in an ether solution at a temperature in the range of $-30°$ to $50°$ C. with the alkali metal preferably in finely dispersed form. Preferably a contact time of 5–30 minutes is employed to permit completion of the reaction. In the reaction a complex between the alkali metal and the naphthalene forms without the release of hydrogen. This complex is stable only in the presence of the ether solvent and will decompose if the solvent is removed.

Ether solvents that are suitable in the metallation of unsaturated hydrocarbons by means of alkali metals are known and have been described, for example, in Wynkoop et al. United States Patent No. 2,822,399. They are of a type that possess the ability to promote or aid in the formation of the alkali metal-hydrocarbon complex. These ethers include any aliphatic mono-ether having a methyl group and 2–4 carbon atoms. Examples include dimethyl ether, methyl ethyl ether, methyl-n-propyl ether, methyl isopropyl ether, and mixtures of these methyl ethers. Other satisfactory ethers include aliphatic polyethers such as the acyclic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, methyl butyl, ethyl butyl, dibutyl and butyl lauryl ethylene glycol ethers, trimethylene glycol dimethyl ether, glycerol trimethyl ether, glycerol dimethyl ethyl ether, and diethylene glycol methyl ethyl ether, glycol formal, methyl glycerol formal, and the like. The methyl monoethers are preferred for practicing the invention.

The ethers used in conjunction with the metallation reaction should not contain any groups such as hydroxyl or carboxyl which are distinctly reactive toward the alkali metal. Although the ether may react in some manner not completely understood, it must not be subject to any action that substantially destroys the ether or uses up the alkali metal or ends to induce polymerization rather than the desired reaction.

The next step in the process involves reacting the alkali metal-naphthalene complex in the ether solvent with carbon dioxide at a temperature in the range of $-80°$ to $40°$ C., preferably $-20°$ to $0°$ C. This can conveniently be carried out by treating the reaction mixture with an excess of gaseous carbon dioxide or Dry Ice and allowing the excess carbon dioxide to evaporate. Reaction of carbon dioxide with the complex causes the formation of the alkali metal salts of dihydronaphthalene dicarboxylic acids in which the carboxyl groups are located at the 1,2- and 1,4-positions and the simultaneous formation of naphthalene. After the reaction is complete, the mixture can be filtered to separate the alkali metal disalts which, if desired, can be washed with diethyl ether to remove occluded naphthalene and solvent. The naphthalene can be extracted from the filtrate by means of a hydrocarbon solvent such as hexane or heptane, recovered from the extract by evaporation of the solvent and recycled for re-use in the first step of the process. The dihydronaphthalene dicarboxylates are then reacted in the next step to effect the desired dehydrogenation and isomerization reactions.

Following the carbon dioxide-alkali metal naphthalene complex reaction as described above, the resulting alkali metal dihydronaphthalene dicarboxylates are subjected to reaction under special conditions which cause simultaneous dehydrogenation of the nucleus and isomerization of the carboxylate groups to the 2,6-arrangement. This is done by a high temperature pyrolysis in the presence of two different types of catalysts and also in the presence of a hydrogen acceptor. The hydrogen acceptor is an unsaturated hydrocarbon of a class as hereinafter defined. The catalysts employed consist of one type which is effective for promoting the isomerization reaction and another type which promotes dehydrogenation of the dihydronaphthalene nucleus. By employing the proper combination of catalysts, hydrogen acceptor and reaction conditions, alkali metal naphthalene-2,6-carboxylate can be obtained in high yield. If either the hydrogen acceptor or dehydrogenation catalyst is omitted, undesirable decarboxylation of the dicarboxylates will result and the main products of the reaction will be naphthalene and naphthalene monocarboxylates instead of the desired 2,6-disalt.

Pyrolysis of the potassium, rubidium or cesium dicarboxylate salts, as the case may be, is carried out by heating the mixture including the two catalysts and the hydrogen acceptor to a temperature in the range of 350–530° C., more preferably 450–510° C., under an atmosphere of carbon dioxide at a partial pressure of 50–1000 p.s.i. and more preferably 100–500 p.s.i. During the pyrolysis it is desirable to agitate the reaction mixture in a manner to provide good contact between the salt phase and the vapor phase to promote reaction between the hydrogen acceptor and released hydrogen. The time that the reaction mixture is maintained within the temperature range of 350–530° C. can vary considerably, for example, from one minute to five hours. However, it is distinctly preferable to maintain the mixture at the desired temperature level, which preferably is in the range of 450–510° C., for only a relatively short time such as 5–30 minutes and then allow it to cool. This procedure tends to minimize undesirable side reactions and result in higher yields of the 2,6-product than when the reaction temperature is maintained for a considerable time.

The isomerization catalyst used in the pyrolysis is selected from the group consisting of the oxides and salts of cadmium, zinc or mercury. In the case of salts they can be derivatives of either organic or inorganic acids. The cadmium oxides or salts seem to be more effective than zinc or mercury compounds and are preferred. The following are examples of catalysts that can be used: cadmium sulfate, cadmium fluoride, cadmium acetate, cadmium benzoate, cadmium bromate, cadmium oxalate, and the corresponding zinc and mercury analogues. The amount of such isomerization catalyst employed can vary widely but preferably is in the range of 2 to 10 moles per 100 moles of the carboxylate salts.

The dehydrogenation catalyst employed in the pyrolysis step can be selected from the following group: Raney nickel, Raney cobalt, palladium, platinum or the halides of nickel, cobalt, palladium and platinum. Palladium is particularly suitable and is preferred. The amount of this second catalyst employed can also vary widely and it preferably is in the range of 0.1–5% by weight based on the dicarboxylate salts.

Proper selection of the hydrogen acceptor is highly important for effecting the conversion of the dihydronaphthalene disalts to naphthalene-2,6-dicarboxylate. In the absence of the hydrogen acceptor, water tends to form under the pyrolysis conditions due to interaction of the released hydrogen with oxygen-containing components of the reaction mixture such as the disalts, any carbon monoxide evolved therefrom or metal oxide used as catalyst. The resulting water will function as a poison in the reaction and prevent rearrangement of the carboxylate groups to the 2,6-positions as well as cause decarboxylation. In addition it is believed that hydrogen itself is a poison for the isomerization catalyst. In order to prevent such undesirable reactions the pyrolysis is carried out with an appropriate hydrogen acceptor present in the reaction zone. The hydrogen acceptor is an unsaturated hydrocarbon which is capable of reacting with hydrogen more readily than the oxygen-containing components of the reaction mixture. The acceptor thus acts as a sponge for the released hydrogen and prevents the formation of water in the system.

Selection of the unsaturated hydrocarbon as hydrogen acceptor can be made on the basis of its hydrogenation equilibrium constant, $Kp$, for the reaction of hydrogen with the hydrocarbon. The hydrogenation $Kp$ can readily be determined from the well known thermodynamic equation:

$$\Delta F_R° = -RT\ln Kp$$

wherein $\Delta F_R°$ is the standard free energy change upon hydrogenation of the unsaturated hydrocarbon, R is the gas constant and T is the absolute temperature in degrees Kelvin. For example, for acetylene which is a preferred hydrogen acceptor, $Kp$ can readily be calculated for the equation $HC{\equiv}CH + H_2 \rightleftharpoons H_2C{=}CH_2$. The calculated value of $Kp$ for this reaction at 25° C. (298° K.) is $4.5 \times 10^{24}$.

For the present purpose any unsaturated hydrocarbon which has a hydrogenation $Kp$ of at least $10^{14}$ for its reaction with hydrogen at 25° C. (298° K.) is suitable for use in the pyrolysis step of the present process. Various hydrocarbons that have acetylenic or olefinic groups conform to this requirement and are suitable. In addition to acetylene, ethylene with a $Kp$ value of $5.6 \times 10^{17}$ and propylene with a value of $6.8 \times 10^{14}$ are suitable. Other satisfactory hydrogen acceptors are propyne, butynes, pentynes, butadiene, isoprene, piperylene, cyclopentadiene, styrene and the like. An aromatic such as naphthalene which has a $Kp$ value for its reaction to tetralin of $2.3 \times 10^{10}$ would not function suitably as a hydrogen acceptor in the process.

The hydrogen acceptor should be added to the reaction zone in an amount in molar excess of the theoretical amount required to react with all the releasable hydrogen in the dihydronaphthalene nucleus. Since one mole of hydrogen can be released from each mole of the disalt, the amount of acceptor should be at least in molar excess of the amount of disalt fed to the reaction zone. The hydrogen acceptor can be introduced into the zone in any desired manner, for example, in admixture with the carbon dioxide which is pressured into the reactor.

Another procedure for providing a hydrogen acceptor in the reaction zone comprises adding thereto a metal carbide, such as aluminum carbide or calcium carbide, which is capable of reacting with water to form acetylene. Thus any water formed in the reaction will react with the metal carbide and release acetylene which will function as the hydrogen acceptor. In using this procedure sufficient water can be purposely added to the reaction zone to form an amount of acetylene that is in molar excess of the hydrogen released from the dihydronaphthalene disalt. Alternatively the metal carbide can be incorporated in the reaction mixture only in such amount as necessary to consume the water produced during the reaction to form an equivalent amount of acetylene and any additional hydrogen acceptor required can be provided by adding to the reactor an unsaturated hydrocarbon as specified above. When a metal carbide is employed, aluminum carbide is preferred.

In addition to the desired 2,6-dicarboxylate product minor amounts of naphthalene and other by-products generally are formed in the pyrolysis reaction. These can be removed from the reaction mixture by evaporation at elevated temperature, for example, by venting the system while the reaction mixture is still hot. The by-products can also be removed by extraction from the salts with a suitable solvent, e.g., benzene, hexane or ethyl ether. After the 2,6-disalt has been freed of the volatile or hydrocarbon-soluble by-products, it is dissolved in water and filtered to recover the catalysts and to remove any carbonaceous material that may have formed during the reaction. The filtrate is then acidified by means of a mineral acid such as hydrochloric acid to convert the salt to naphthalene-2,6-dicarboxylic acid which forms as a precipitate and can be recovered by filtration. Generally minor amounts of other naphthalene dicarboxylic acids resulting from incomplete rearrangement of the carboxylate groups in the reaction will be present in the 2,6-product. These other acids can be selectively removed from the desired product by washing it with methanol, since the 2,6-diacid has distinctly lower solubility in alcohol than the other isomers. When a high purity 2,6-product is desired, it may be desirable to carry out such washing step at elevated temperature to insure effective removal of the other isomers.

In order to effect economies in the process it is desirable to recover the alkali metal from the aqueous salt solution obtained upon filtering out the naphthalene-2,6-dicarboxylic acid after the 2,6-disalt solution has been acidified. This can be done by evaporating water and treating the alkali metal chloride residue with metallic sodium at a temperature in the range of 500–800° F. under reduced pressure. Under these conditions the sodium will replace the other alkali metal from the salt and the other alkali metal will distill from the mixture and can be recycled to the first step of the process. Since sodium is considerably less expensive than potassium, rubidium or cesium, the incorporation of such recovery procedure in the process substantially reduces the cost of the operation.

As an illustration of the recovery procedure assuming that potassium is the alkali metal used in Step (1) of the process, the KCl obtained upon removing water from the mineral salt solution is pumped in molten form into an upper section of a fractionator which is operated as a stripping column without overhead reflux. The temperature in the column is maintained in the range of 500–800° F. and the pressure therein is maintained at about 2 mm. Hg absolute. Part way down the column, molten sodium is introduced and it flows downwardly in contact with the downflowing molten KCl. The bottom of the column is heated, as by means of an electric heater, to reboil sodium chloride and supply heat for evaporation of metallic potassium. Within the column an exchange reaction occurs between the molten KCl and sodium vapor to produce potassium vapor and molten sodium chloride. The downflowing stream of KCl above the introduction level of sodium serves to wash out any sodium vapor and prevent it from distilling overhead with the potassium. Liquid sodium chloride, melting point 479° F., is withdrawn from the column. The melting point can be further lowered by allowing a slight excess of potassium chloride to be introduced into the system. The metallic potassium from the top of the column is condensed by means of a tubular heat exchanger held above the melting point of metallic potassium, 145° F. The recovered potassium is recycled to the first step of the process. When rubidium or cesium is used in place of potassium, a similar recovery procedure is employed.

The following examples illustrate the present process:

*Example I.—Preparation of potassium dihydronaphthalene dicarboxylates*

A one molar solution of naphthalene dissolved in dimethyl ether is placed in a reactor equipped with a stirrer and potassium in the form of a fine dispersion in a suitable medium such as petroleum naphtha is added to the reactor in a mole ratio of 0.95 based on the naphthalene. The mixture is stirred vigorously while being maintained at a temperature of −20°–0° C. under autogenous pressure. A reaction time of 20 minutes is preferably employed to insure substantial completion of the reaction. Excess $CO_2$ is then added to the reactants under agitation while maintaining the temperature in the range of −20° to 0° C. Reaction of the potassium naphthalene with the carbon dioxide causes the formation of potassium dihydronaphthalene dicarboxylate salts. Naphthalene is also formed in this reaction and remains substantially in solution in the solvent. After the excess carbon dioxide has evaporated, the potassium salt mixture is separated by filtration and is washed with petroleum naphtha to remove any occluded naphthalene and solvent. The salts obtained are a mixture of potassium dihydronaphthalene 1,2- and 1,4-dicarboxylates.

*Example II.—Dehydrogenation and isomerization of dihydronaphthalene dicarboxylates*

Mixed potassium dihydronaphthalene dicarboxylates obtained as in the preceding example and containing by weight 3% of cadmium chloride and 3% palladium are placed in a steel bomb and the bomb is purged with carbon dioxide. The bomb is pressured to 300 p.s.i.g. with carbon dioxide and acetylene is introduced into the reactor in an amount equivalent to 110 mole percent based on the dicarboxylates. The bomb is then heated to 475° C., held at this temperature for a period of 15 minutes, and cooled to room temperature. Naphthalene, formed in minor amount by the side reaction of dicarboxylation, is extracted from the reaction mixture with diethyl ether, the remaining potassium salts are dissolved in water, and the solution is purified by filtration and carbon treatment. The purified aqueous solution is acidified, and a yield of naphthalene-2,6-dicarboxylic acid equivalent to 75–80% of theory is obtained.

*Example III*

This is a comparison example in which the pyrolysis is carried out without the use of a hydrogen acceptor or a dehydrogenation catalyst in order to show the improvement achieved by operating according to the invention. In the present example an attempt is made to dehydrogenate the dihydronaphthalene dicarboxylates first and then to effect isomerization to the 2,6-arrangement at a higher temperature.

Mixed potassium dihydronaphthalene dicarboxylates prepared as in Example I and containing 3 weight percent of cadmium chloride are placed in a steel bomb, the bomb is purged and pressured to 100 p.s.i.g. with nitrogen and is then heated to 264° C. for 15 minutes, after which the bomb is cooled to room temperature and the gas is vented. Analysis of the vent gas shows 1.5% hydrogen, 2.7% $CO_2$ and the remainder nitrogen. The presence of $CO_2$ indicates that considerable decarboxylation has occurred. The bomb is then pressured to 300 p.s.i.g. with carbon dioxide, heated to 475° C. and cooled to room temperature. Naphthalene is extracted from the reaction mixture with diethyl ether, and the resulting potassium salts are dissolved in water and acidified. The yields of naphthalene and naphthalene-2,6-dicarboxylic acid obtained are 58% and 16% of theory respectively.

A comparison of Examples II and III shows that operation according to the present invention by including a hydrogen acceptor and a dehydrogenation catalyst in the reaction mixture effects a marked improvement in the yield of the naphthalene-2,6-dicarboxylic acid obtained. When other hydrogen acceptors and dehydrogenation catalysts as specified herein are used, or when rubidium or cesium is substituted for potassium, similar improvements in the yield of the 2,6-diacid are obtained.

I claim:

1. Method of preparing naphthalene-2,6-dicarboxylic acid which comprises heating an alkali metal dihydronaphthalene dicarboxylate in which the alkali metal is selected from the group consisting of potassium, rubidium and cesium and the carboxylate groups are positioned other than in the 2,6-arrangement on the dihydronaphthalene nucleus to a temperature in the range of 350–530° C. in an atmosphere of carbon dioxide at a partial pressure of 50–1000 p.s.i., in the presence of an unsaturated hydrocarbon hydrogen acceptor having a hydrogenation $Kp$ of at least $10^{14}$, in the presence of a first catalyst selected from the group consisting of oxides and salts of cadmium, zinc and mercury and in the presence of a second catalyst selected from the group consisting of Raney nickel, Raney cobalt, palladium, platinum and halides of nickel, cobalt, palladium and platinum, whereby alkali metal naphthalene-2,6-dicarboxylate is formed, and converting the dicarboxylate to naphthalene-2,6-dicarboxylic acid by means of mineral acid.

2. Method according to claim 1 wherein the alkali metal is potassium.

3. Method according to claim 2 wherein the temperature is in the range of 450–510° C.

4. Method according to claim 1 wherein the temperature is in the range of 450–510° C.

5. Method according to claim 1 wherein said second catalyst is palladium.

6. Method according to claim 1 wherein said alkali metal dihydronaphthalene dicarboxylate is prepared by (1) reacting an alkali metal selected from the group consisting of potassium, rubidium and cesium with naphthalene at —30° to 50° C. in the presence of an ether solvent selected from the group consisting of methyl monoethers having 2–4 carbon atoms and aliphatic polyethers to form an alkali metal naphthalene complex; (2) contacting the complex dissolved in such solvent with carbon dioxide at —80° to 40° C. to form alkali metal dihydronaphthalene dicarboxylates; and (3) separating the dicarboxylates from the reaction mixture.

7. Process according to claim 6 wherein the alkali metal naphthalene-2,6-dicarboxylate is treated with hydrochloric acid to obtain the naphthalene-2,6-dicarboxylic acid, the resulting alkali metal chloride is reacted with sodium to form free alkali metal and NaCl and the free alkali metal is recycled to Step (1).

References Cited by the Examiner

UNITED STATES PATENTS 2,849,482   8/1958   Raecke _____ 260—515

OTHER REFERENCES

Lyssy, J. Organic Chemistry, 27, 5–13 (1962).

LORRAINE A. WEINBERGER, *Primary Examiner.*

LEON ZITVER, *Examiner.*

R. E. MASSA, T. L. GALLOWAY, JR.,
*Assistant Examiners.*